(12) United States Patent
Konishi

(10) Patent No.: US 6,208,852 B1
(45) Date of Patent: Mar. 27, 2001

(54) TELEPHONE, TELEPHONE EXCHANGE SYSTEM, STORAGE MEDIUM AND METHOD INCORPORATING SUSPEND SERVICE

(75) Inventor: Kuniyoshi Konishi, Tokyo (JP)

(73) Assignee: Nihon Medipack Co., Ltd., Tokyo (JP)

( * ) Notice: Subject to any disclaimer, the term of this patent is extended or adjusted under 35 U.S.C. 154(b) by 0 days.

(21) Appl. No.: 08/922,947

(22) Filed: Sep. 3, 1997

(30) Foreign Application Priority Data

Dec. 26, 1996 (JP) .................................................. 8-347188

(51) Int. Cl.⁷ .................................................. H04Q 7/22

(52) U.S. Cl. ........................... 455/414; 455/567; 379/215

(58) Field of Search .................................. 379/190, 191, 379/192, 193, 209, 215; 455/414, 401, 565, 567, 444

(56) References Cited

U.S. PATENT DOCUMENTS

| | | | |
|---|---|---|---|
| 5,548,636 | * 8/1996 | Bannister et al. | 455/567 |
| 5,619,568 | * 4/1997 | Miller | 455/567 |
| 5,657,372 | * 8/1997 | Ahlberg et al. | 455/414 |
| 5,758,280 | * 5/1998 | Kimura | 455/567 |
| 5,812,648 | * 9/1998 | Wanner | 379/190 |

* cited by examiner

Primary Examiner—Daniel S. Hunter
Assistant Examiner—Thuan T. Nguyen
(74) Attorney, Agent, or Firm—Merchant & Gould P.C.

(57) ABSTRACT

The user operates a hand-held telephone to set the telephone in the suspend mode in which call termination at that telephone is denied, and to set the time duration of the suspend mode. After they are set, the time elapsed after the mode is started is automatically calculated. When the telephone receives a call before the set suspend duration time elapses, a message indicating the remaining time until the suspend duration time elapses and that the telephone is in the suspend mode is sent back to the calling party.

23 Claims, 13 Drawing Sheets

SUSPEND SERVICE START REQUEST

SUSPEND SERVICE CANCEL REQUEST

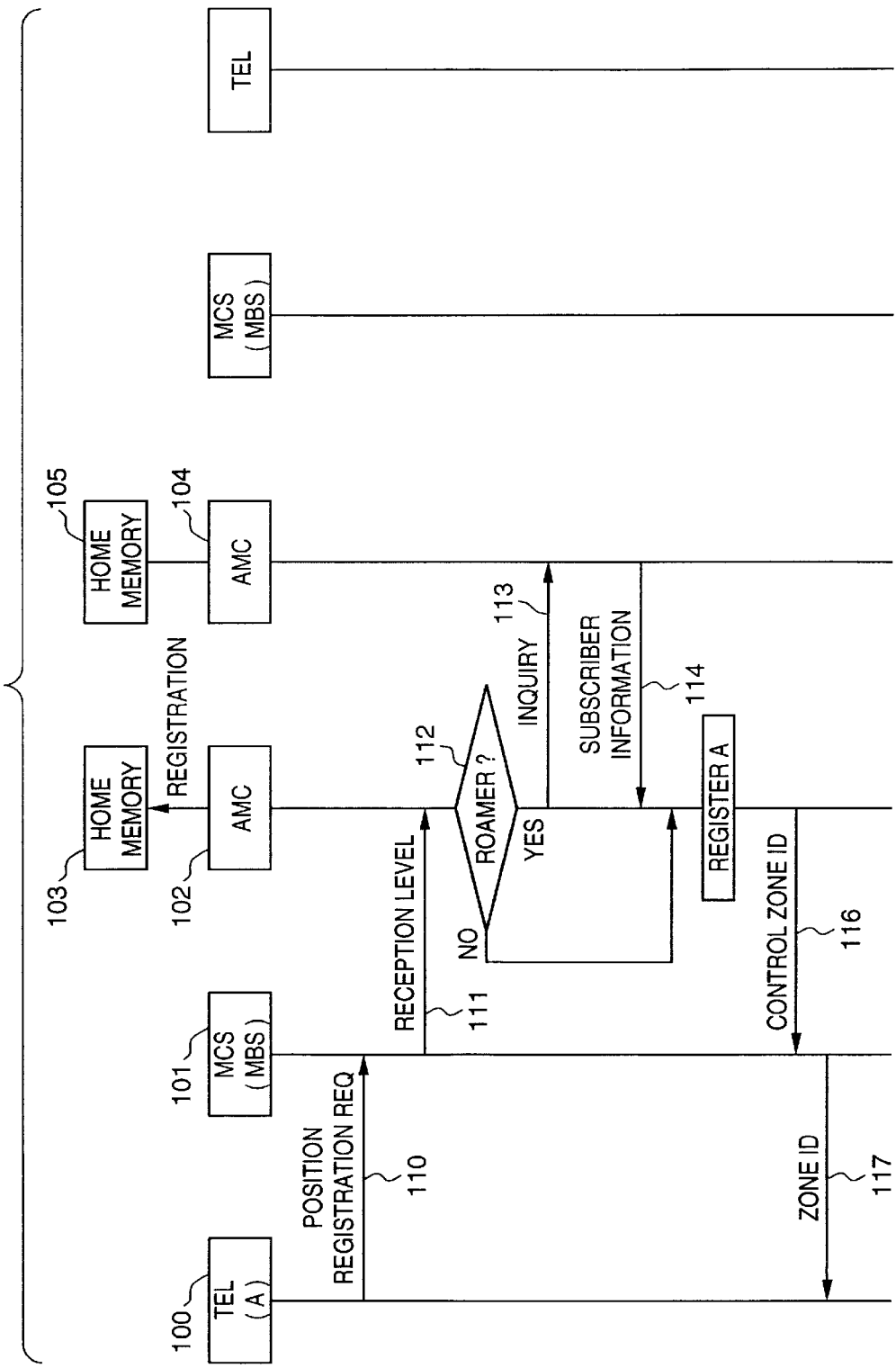

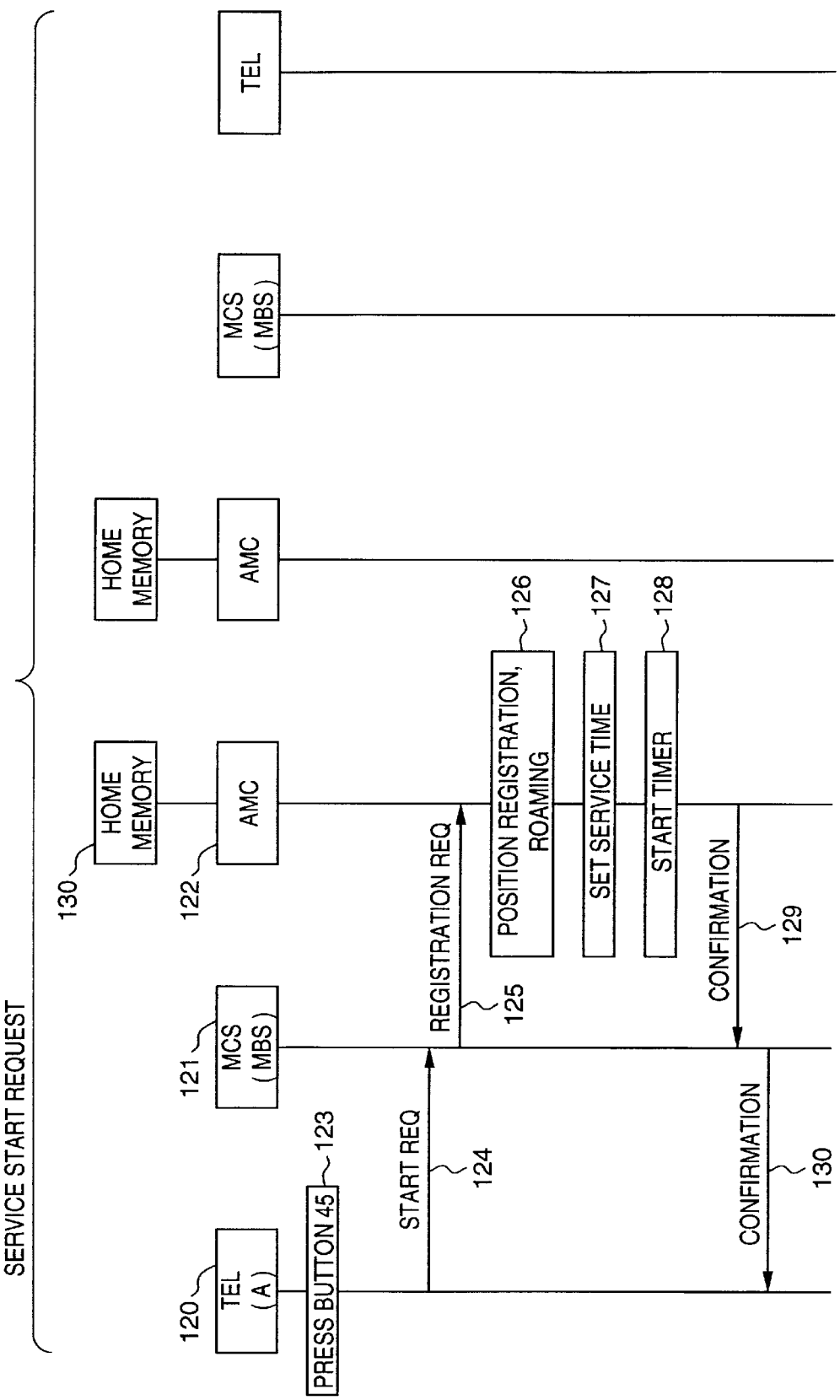

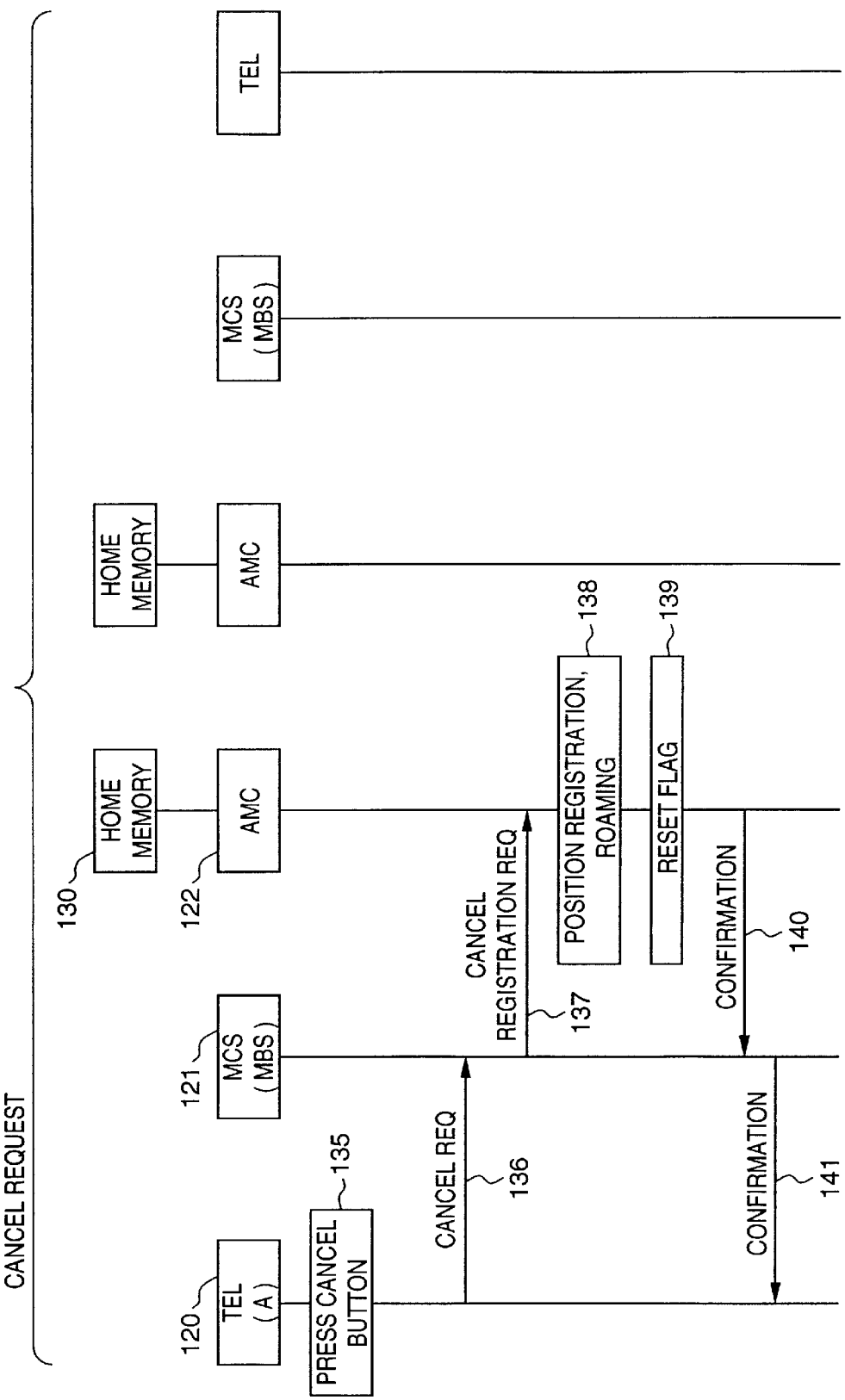

TELEPHONE, TELEPHONE EXCHANGE SYSTEM, STORAGE MEDIUM AND METHOD INCORPORATING SUSPEND SERVICE

BACKGROUND OF THE INVENTION

The present invention relates to a communication service method for a telephone such as a hand-held telephone or mobile phone and a hand-held telephone that uses such services and, more particularly, to designation and signaling of a suspend period.

Conventionally, when a person carrying a hand-held telephone is having a business talk or attending a meeting, party, or the like while his or her hand-held telephone is kept ON, such hand-held telephone informs him or her of the presence of an incoming call by a ringing tone, vibrations, or the like. Conventionally, the user answers the phone at that place or by quitting his or her seat. If the conversations made so far are interrupted since the user of the hand-held telephone answers the phone, for example, such behavior may offend the feelings of a person the user has been talking to or may cause troubles to other attendants of the meeting.

In such case, if the user turns off the power switch of the hand-held telephone in advance or simultaneously with call termination, he or she no longer troubles the person the user has been talking to or the attendants of the meeting, but cannot know business of the calling party. Furthermore, when the user turns off the power switch of the hand-held telephone in advance, he or she cannot recognize even that he or she has indeed received a call. Moreover, the calling party cannot understand the current situation of the user of the hand-held telephone, and cannot find out when the user will answer the phone, thus feeling anxiety and irritation.

Such problem is also posed when the user of the hand-held telephone turns off the power switch if he or she is traveling by some traffic facility or wants to rest.

Note that the following service is available. With this service, a call to be placed to the OFF hand-held telephone is received by a hand-held telephone service center instead to receive the corresponding message, and the user of the hand-held telephone inquires of the center later to hear the message. Furthermore, a service for transferring a call to a designated telephone number is also available.

However, with an automatic answering phone service, a message is delivered to the called party after a certain delay time, and during this delay time, the calling party cannot detect the state of the called party. On the other hand, with a call transfer service, another person must attend at the destination of call transfer. As described above, with these services, some problems remain unsolved.

SUMMARY OF THE INVENTION

The present invention has been made to solve the conventional problems and has as its object to provide a communication service method, a telephone, and a storage medium that stores a program for implementing the service method.

In order to achieve the above object, according to the present invention, there is provided a communication service method for a telephone, comprising the steps of:

detecting that a suspend mode is set in which incoming calls at the telephone are denied, and a suspend duration time set when the telephone has been initially set in the suspend mode;

calculating, after the telephone is initially set in the suspend mode, a remaining suspend time for which the suspend mode for the telephone is held; and transmitting, when the telephone receives a call, to a calling party a message including information which indicates a remaining suspend time until the suspend modes terminates, and information which indicates the telephone is in the suspend mode.

The calling party can be informed of the wait time required until the called party becomes ready to communicate.

According to one preferred aspect of the present invention, in order to set the telephone in the suspend mode, a predetermined switch provided to the hand-held phone is operated.

According to one preferred aspect of the present invention, the information indicative of suspend duration time is stored in a memory of the telephone.

According to one preferred aspect of the present invention, the information indicative of suspend duration time is stored in a memory of a telephone exchange station.

According to one preferred aspect of the present invention, the message is generated by an exchange, and is sent from the exchange to the calling party. Since the exchange supports the suspend service, the load on subscribers can be reduced.

According to one preferred aspect of the present invention, the message is generated by the telephone and is sent from the telephone to the calling party. Since the individual telephones support the suspend service, processes required for changing the system can be reduced.

According to one preferred aspect of the present invention, information indicating that the telephone is set in the suspend mode is stored in a database of an exchange.

According to one preferred aspect of the present invention, when the telephone sends a suspend mode start request to an exchange, the exchange checks if the telephone is under a suspend service contract. The telephone need not check whether it is under contract for suspend services, and those under contract can be centrally managed.

According to one preferred aspect of the present invention, the suspend mode that has been started can be canceled. The convenience can be improved.

According to one preferred aspect of the present invention, a suspend service is charged for.

According to one preferred aspect of the present invention, an initial time duration of the suspend mode is fixed. The control can be simplified.

According to one preferred aspect of the present invention, the initial time duration of the suspend mode can be set by a user by an operation at the telephone. A variety of user's needs can be met.

According to one preferred aspect of the present invention, information indicating that the telephone is set in the suspend mode is managed by an exchange closest to the telephone. Subscriber information can be managed centrally.

According to one preferred aspect of the present invention, information indicating that the telephone is set in the suspend mode is managed by an exchange to which the telephone belongs. Subscriber information can be managed centrally.

In order to achieve the above object, there is provide a telephone which can set a suspend mode in which a message indicating that the telephone is currently in the suspend mode, and information indicating a time duration of the suspend mode are sent back to a calling party, comprising:

a first switch which allows a user to set the suspend mode.

According to one preferred aspect of the present invention, the telephone further comprises a second switch which allows a user to set an initial suspend duration time.

A telephone which can be used in both the system in which the suspend service is supported by the exchange and the system in which the suspend service is supported by the telephone itself, can be provided.

According to one preferred aspect of the present invention, the telephone further comprises a third switch for canceling the suspend mode that has been started. A telephone which can be used in both the system in which the suspend service is supported by the exchange and the system in which the suspend service is supported by the telephone itself, can be provided.

According to one preferred aspect of the present invention, the telephone further comprises means for sending an identification number of the telephone and a request command indicating that the suspend mode is started to an exchange in response to an operation of the first switch. A telephone which is used in the system in which the suspend service is supported by the exchange can be provided.

According to one preferred aspect of the present invention, the telephone further comprises means for generating a message which informs the calling party that the telephone is in the suspend mode and of a time duration required until the suspend mode ends when the telephone set in the suspend mode receives a call. A telephone which is used in the system in which the suspend service is supported by the telephone itself can be provided.

According to one preferred aspect of the present invention, the suspend mode is forcibly reset when the third switch is operated. A telephone which can be used in both the system in which the suspend service is supported by the exchange and the system in which the suspend service is supported by the telephone itself, can be provided.

In order to achieve the above object, there is also provided a storage medium which stores a program that can be executed by a computer built in a telephone, comprising:

first program code means for setting the telephone in a suspend mode upon operation of a first switch provided to the telephone by a user;

second program code means for setting an initial time duration of the suspend mode in response to an operation of the first switch; and third program code means for generating a message that requests an exchange that the telephone be set in the suspend mode, and informs the exchange of the time duration.

In order to achieve the above object, there is also provided a storage medium which stores a program that can be executed by a computer built in a telephone, comprising:

first program code means for setting the telephone in a suspend mode upon operation of a first switch provided to the telephone by a user;

second program code means for setting an initial time duration of the suspend mode in response to an operation of the first switch; and third program code means for generating a message that informs a calling party that the telephone is in the suspend mode, and of a time duration until the suspend mode ends in response to a call received after the telephone is set in the suspend mode.

According to another preferred aspect of the present invention, the method is applied to control a hand-held telephone.

According to further preferred aspect of the present invention, the telephone is applied to a hand-held telephone.

In order to achieve the above object, there is also provided a communication service method for a telephone, comprising the steps of:

permitting a user to operate a telephone in order to set the telephone in a suspend mode in which incoming calls at the telephone are denied; and permitting the user to enter, through the telephone, information indicating a suspend time during which the set suspend mode holds.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a flow chart for explaining the position registration and roaming schemes of a mobile communicator used in the first and second embodiments of the present invention;

FIG. 7A shows the format of a suspend service cancel request according to the first embodiment;

FIG. 7B is a flow chart for explaining the processing sequence of the service cancel request used in the first embodiment;

DETAILED DESCRIPTION OF THE PREFERRED EMBODIMENTS

The two preferred embodiments (first and second embodiments) to which the suspend service of the present invention is applied will be explained hereinafter with reference to the accompanying drawings.

In the suspend service of the present invention, an exchange sends back a message indicating a suspend mode (to be referred to as a suspend message hereinafter) to the calling party instead of the user of a hand-held telephone (first embodiment), or the hand-held telephone itself sends back such message (second embodiment). For this reason, the generation management of the suspend message and the management of the suspend duration time are done by the exchange in the first embodiment, and are done by the telephone itself in the second embodiment.

In the following description, a service for sending back a "suspend message" to the calling party will be referred to as a "suspend message send-back service" hereinafter, and a service for managing the suspend duration time will be referred to as a "suspend duration time management service". A combination of the "suspend message send-back service" and "suspend duration time management service" will be referred to as a "total suspend message service".

In both the first and second embodiments, the user of the hand-held telephone, i.e., the called user must sign a contract for the "total suspend message service" with a certain telephone service company. The service contract includes two contract patterns, i.e., a contract of providing only the "suspend message send-back service" (i.e., only a service of sending back a "suspend message"), and a contract of providing both of the two services, i.e., the "suspend message send-back service" and "suspend duration time management service" (i.e., the "total suspend message service" contract). Under the contract of providing only the "suspend message send-back service" (first-class service contract), a message " . . . cannot answer at the moment" is sent back to the calling user. Under the "total suspend message service" contract (second-class service contract), a message " . . . cannot answer at the moment. Please call again XX hours later" is sent back.

Note that a conventional service for sending back a message indicating that the terminal of the receiving user is busy is available. However, the "suspend message send-back service" is markedly different from the conventional service since it sends back the called user's name, and a message indicating that the called user himself or herself is busy (not a message indicating that the terminal phone is busy) to the calling party.

On the other hand, the "total suspend message service" is considerably different from the conventional service since it also performs updating management of the suspend duration time in addition to the "suspend message send-back service", i.e., the calling party can make certain the time to call again.

First Embodiment

Figure 1:
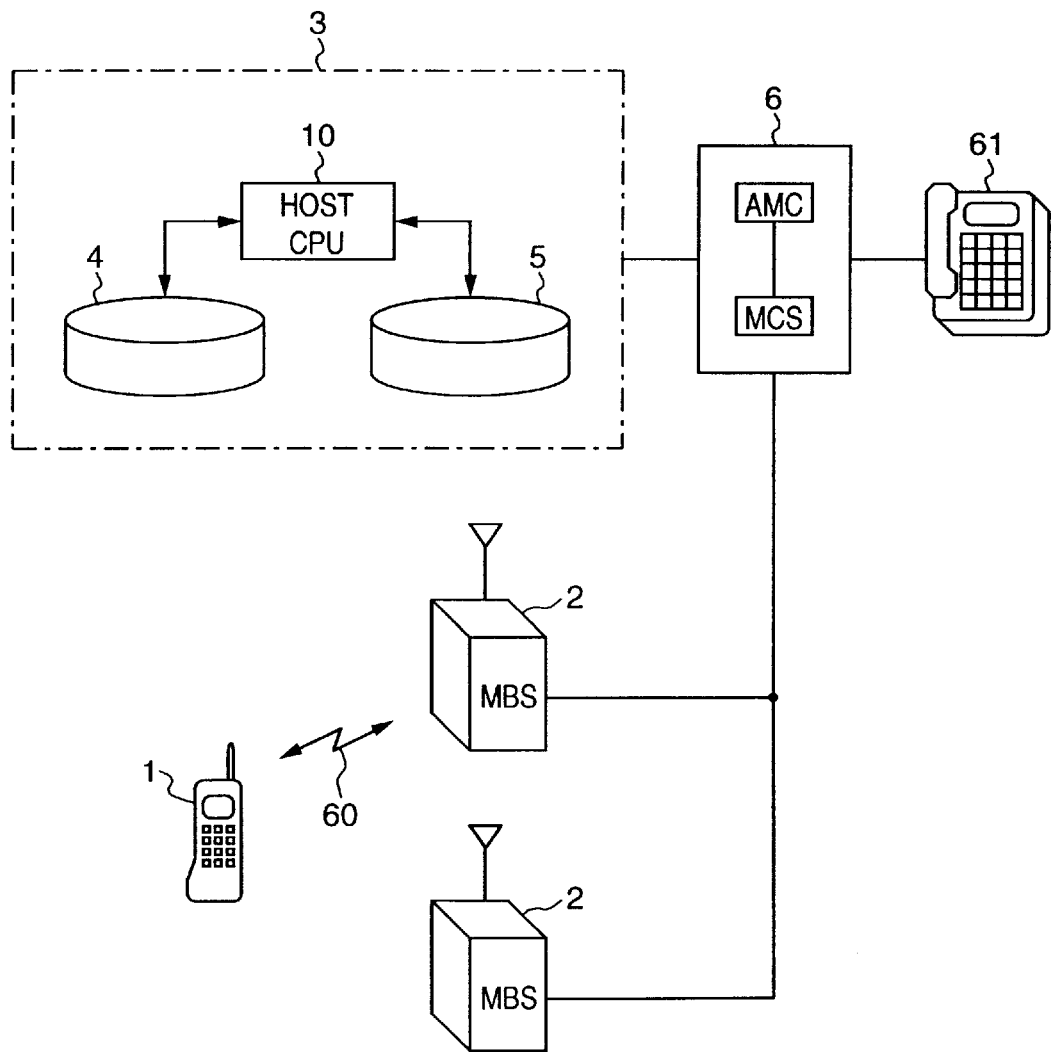
FIG. 1 is an explanatory view of the basic arrangement of a system used when the present invention is applied to a digital hand-held telephone service.

FIG. 1 shows the overall arrangement of a suspend service system according to the first embodiment, and the present invention is applied to a digital system, for example.

Referring to FIG. 1, reference numeral 1 denotes a hand-held telephone (terminal); 2, radio base stations or cell cites (MBS) closest to the calling party; 3, a home memory station of a mobile communication control station (AMC) which has databases of various kinds of information, and to which a receiving user belongs; 6, a digital network; 60, a radio telephone channel; and 61, a stationary telephone.

Figure 2:
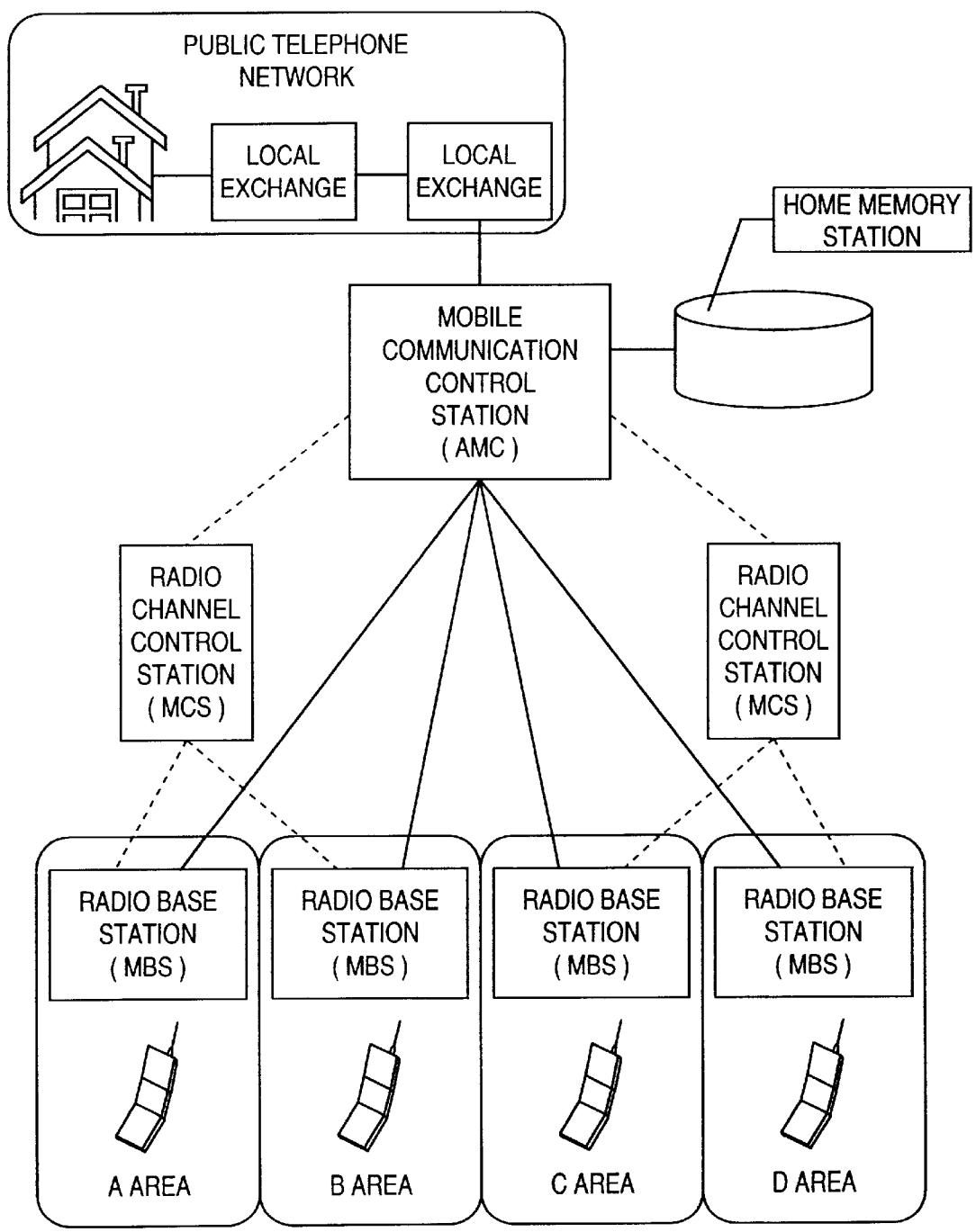
FIG. 2 is a chart for explaining the principle of subscriber tracking in a digital network to which the present invention is applied.

In FIG. 1, the digital network 6 includes the mobile communication control station (AMC) and the radio channel control station (MCS) for the sake of convenience. More specifically, as shown in FIG. 2, a hand-held telephone service area is divided into a plurality of areas or cites, and the telephone of the user receives services from a radio base station (MBS) within the area where the use is currently present. A plurality of radio base stations are under the control of a host radio channel control station (MCS) or mobile communication control station (AMC). The mobile communication control station (AMC) can access the home memory station that stores management information of users who subscribe to its own exchange.

The home memory station 3 includes a management database 4 that manages information (including information of service contracts and charge information) regarding all the subscribers to which the home memory station 3 provides services, and a control information database 5 including control information required for controlling the hand-held telephones of these subscribers.

Figure 3A:
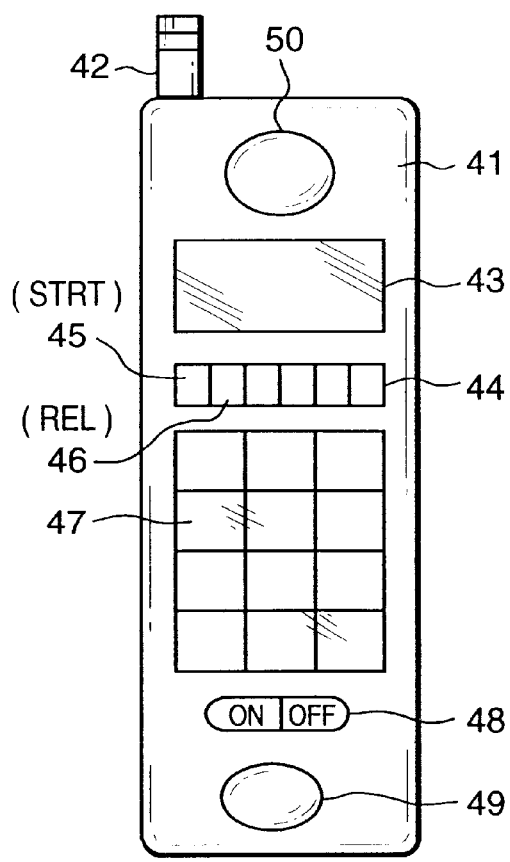
FIGS. 3A and 3B are respectively a plan view and a side view showing the outer appearance of a hand-held telephone according to the first and second embodiments of the present invention.
Figure 3B:
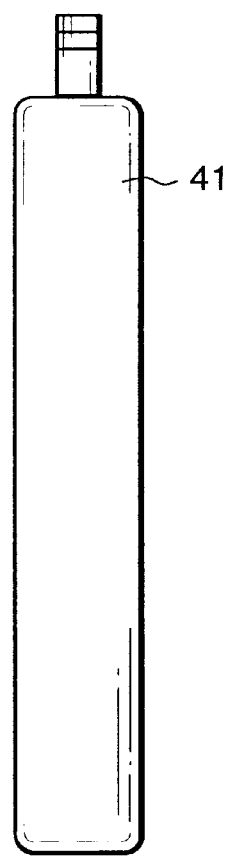

FIGS. 3A and 3B show the outer appearance of a hand-held telephone that can receive the "suspend message send-back service" and "suspend duration time management service". FIG. 3A is a front view of the telephone and FIG. 3B is a side view thereof.

In FIGS. 3A and 3B, reference numeral 41 denotes a main body of the hand-held telephone; 42, a transmission/reception antenna; 43, a display, 44, button switches used for designating functions; 47, switches including a ten-key pad; 48, a power ON/OFF button; 49, a transmitter; and 50, a receiver.

The hand-held telephone designates a function depending on the button to be pressed of the buttons 44. In particular, when a STRT button 45 is pressed, the "suspend message send-back service" and "suspend duration time management service" are started. On the other hand, when an REL button 46 is pressed, the services started upon depression of the STRT button 45 are canceled and interrupted.

In the first embodiment, the user can set the time duration he or she wants to receive the suspend service. More specifically, if the service is provided in units of, e.g., minutes, the user presses switches "2" and "0" in turn of the ten-key pad of the button switches 47 to designate the suspend duration time of 20 minutes.

Figure 3C:
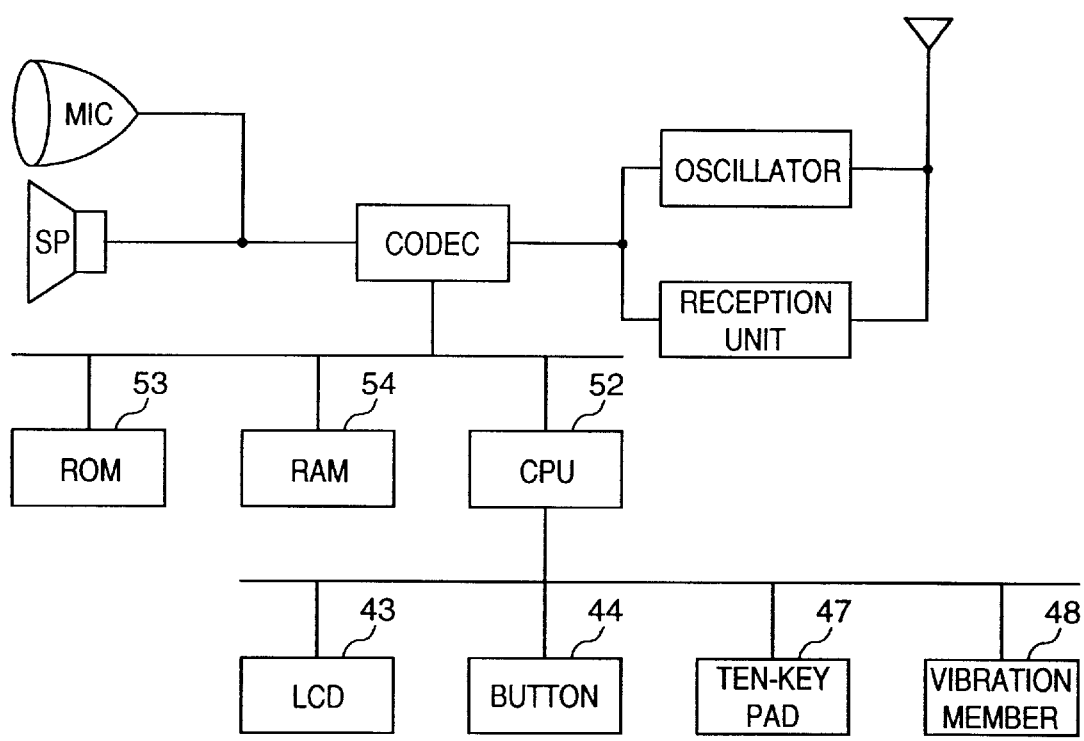
FIG. 3C is a block diagram showing the arrangement of a hand-held telephone according to the first embodiment of the present invention.

FIG. 3C is a block diagram showing the internal circuit arrangement of this hand-held telephone. The arrangement shown in FIG. 3C uses known circuit arrangement parts, and the novel function of the first embodiment is implemented when a CPU 52 executes a program stored in a ROM 53. Hence, the hardware arrangement is substantially the same as that of a conventional hand-held telephone except for the program contents of the ROM and addition of buttons 45 and 46.

In normal mobile communications, as is well known, when a subscriber A who is registered in a certain exchange X enters the service area of another exchange Y, that subscriber is called a roamer. Since the exchange Y has no information of the subscriber A, it acquires the information of the subscriber A from the exchange X to which the subscriber A belongs. Acquisition of the information of a subscriber as a roamer is conventionally called roaming. Each mobile communication control station (AMC) in this embodiment is capable of roaming.

Figure 4A:
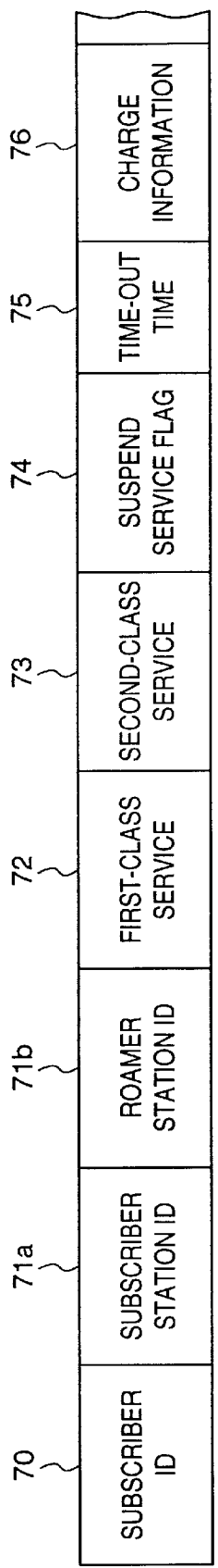
FIG. 4A shows the format of subscriber management information in a database 4 that supports the suspend service according to the first embodiment.

FIG. 4A shows the format of subscriber information used in the system of the first embodiment and stored in the database 4.

A head field 70 of the subscriber information stores "subscriber ID" that includes a telephone number to identify that subscriber. A second field 71a stores the identifier of the mobile communication control station (AMC) to which that subscriber has signed a contract and belongs. When the subscriber specified by the field 70 enters an area where that subscriber is a "roamer", the identifier of the mobile communication control station (AMC) which controls that area is stored in a field 71b of the subscriber information in the home memory station of that mobile communication control station (AMC).

A field 72 stores information indicating whether or not the subscriber specified by the field 70 has signed the first-class service contract (suspend message send-back service). A field 73 stores information indicating whether or not the subscriber specified by the field 70 has signed the second-class service contract (suspend duration time management service). A field 74 stores a flag (suspend service flag) indicating whether or not that subscriber is receiving the suspend service now. A field 75 stores the remaining suspend duration time for that subscriber, i.e., the time-out time of the suspend service. A field 76 stores charge information for that subscriber.

Figure 5A:
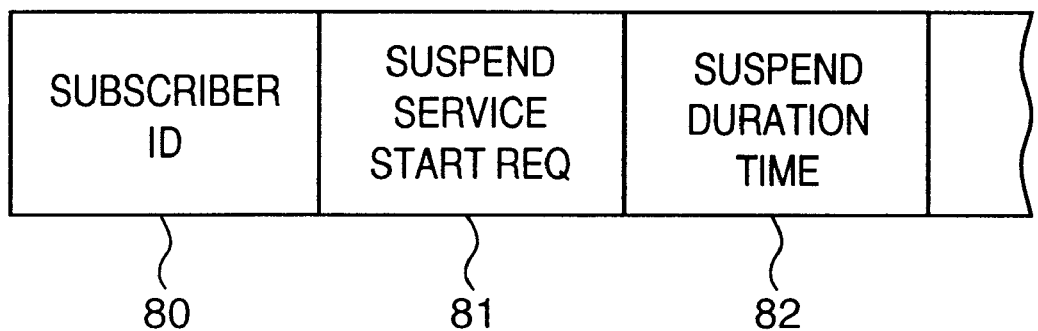
FIG. 5A shows the format of a suspend service start request according to the first embodiment.

In the first embodiment, only a subscriber who has already signed the suspend service contract (the first- and second-class contracts) can receive the suspend service. When the subscriber of the hand-held telephone who has already signed the contract wants to receive the suspend service currently, he or she presses the STRT button 45, as described above. When this button is pressed, the telephone of the first embodiment sends a suspend service start request message with the format shown in FIG. 5A to the exchange. More specifically, this message consists of a field 80 including the identifier of that subscriber, a field 81 for storing a request ID (="1") indicating that this message requests start of the suspend service, and a "suspend duration time" field 82 for storing the time duration the subscriber wants to receive the suspend service.

Figure 5B:
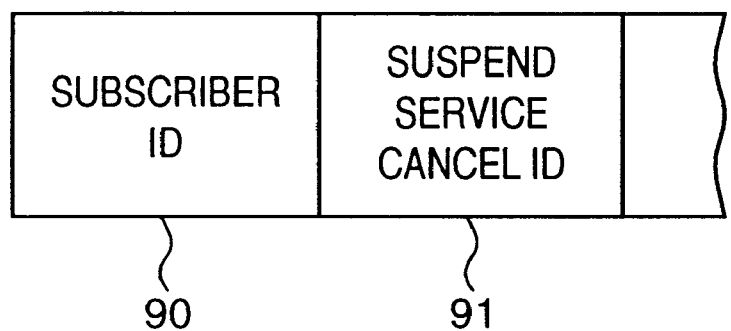
FIG. 5B shows the format of a suspend service cancel request according to the first embodiment.

When the subscriber wants to cancel the suspend service that has been requested and accepted, he or she presses the REL button 46. When this button 46 is pressed, the telephone sends a "suspend service cancel request" with the format shown in FIG. 5B to the exchange. This request message consists of a field 90 including the identifier of that subscriber, and a field 91 for storing an identifier (="2") indicating that the request message is a cancel message.

FIGS. 6 to 8B are flow charts for explaining the control sequence of the first embodiment.

FIG. 6 shows the known position registration procedure and roaming procedure in the technical field of mobile communications. Note that the position registration procedure and roaming procedure differ depending on countries, but are essentially the same. Hence, in this specification, the position registration procedure and roaming procedure in Japan will be described with the aid of FIG. 6.

More specifically, FIG. 6 shows the position registration procedure and roaming procedure when, for example, a subscriber A as a roamer with his or her hand-held telephone 100 enters the service area of a mobile communication control station (AMC) 102 to which the subscriber A does not belong. When the telephone 100 of the subscriber as a roamer transmits a position registration request within the area of this mobile communication control station (AMC) 102, radio base stations (MBS, MCS) 101 and the like that received this request send the reception levels (111) of that request radio wave to the mobile communication control station (AMC) 102. In the position registration procedure, there can be a plurality of radio base stations (MBS, MCS) and the like that receive the request from the telephone 100.

In roaming, since all the radio base stations (MBS, MCS) 101 and the like that receive the request are programmed to send reception level information and the like to the mobile communication control station (AMC) 102, the mobile communication control station (AMC) 102 determines that the hand-held telephone of that subscriber is closest to the radio base station (MBS, MCS) or the like with the highest reception level among the plurality of radio base stations (MBS, MCS) and the like.

Figure 4B:
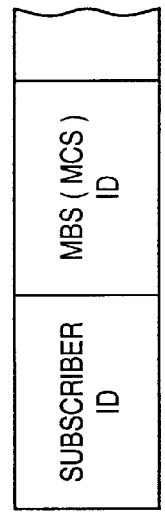
FIG. 4B shows the format of subscriber management information in a database 5 that supports the suspend service according to the first embodiment.

The mobile communication control station (AMC) 102 checks in step 112 if the person who requested the position registration belongs to the own mobile communication control station (AMC) 102. If that person is not a roamer, the station 102 determines in step 115 that the radio base station (MBS, MCS) 101 or the like is a radio station closest to that person who requested the registration, and registers the closest radio base station (MBS, MCS). FIG. 4B shows the format of this database 5.

On the other hand, if the subscriber A who requested the position registration does not belong to the own mobile communication control station (AMC) 102, the station 102 accesses a home memory 105 of a mobile communication control station (AMC) to which the roamer A belongs, in step 113, to acquire subscriber information of the roamer A in step 114, and registers the subscriber information of the roamer A in a home memory 103 of the mobile communication control station (AMC) 102 in step 115. Upon registration, the ID of the mobile communication control station (AMC) 105 is stored in a field 71b of the database 4 in the home memory 103. The mobile communication control station (AMC) 102 sends a control zone ID to the selected radio base station (MBS, MCS) 101 or the like in step 116. The radio base station (MBS, MCS) 101 or the like sends an ID in step 117 to the telephone 100 of the roamer to indicate that it is the closest radio base station (MBS, MCS) or the like.

In this manner, wherever the user who requests the suspend service or the calling party (who places a call to that user) goes, the positions and subscriber information of such users are stored and updated in the home memory of the closest mobile communication control station (AMC).

FIG. 7A explains the procedure when the subscriber A requests the exchange to start the suspend service.

More specifically, the subscriber who wants to request to start the service presses the STRT button 45 of his or her telephone 120. A CPU 52 of the telephone 120 detects the depression of the button 45 in step 123 in accordance with the program stored in a ROM 53. In step 124, the CPU 52 sends a suspend service start request (see FIG. 5A) to a radio base station (MBS, MCS) 121 or the like. Upon reception of this request message, the radio base station (MBS, MCS) 121 or the like sends a suspend service start registration request to a mobile communication control station (AMC) 122 in step 125. Upon reception of this request, the mobile communication control station (AMC) 122 performs position registration (roaming in some cases) of that subscriber (the person who requested the service) in step 126. In step 127, the mobile communication control station (AMC) 122 accesses the database 4 in a home memory 130 in accordance with the subscriber ID designated in a field 80 in the request message, sets the suspend duration time designated in a field 82 in a field 75 (time-out time) of the record of that subscriber, and also sets the value of the suspend service flag (field 74) at "1". In step 128, the station 122 starts a timer. In this manner, the suspend service for the subscriber A is started.

Furthermore, the mobile communication control station (AMC) 122 sends a message that confirms that the service has been started to the radio base station (MBS, MCS) 121 or the like in step 129A, and the ratio base station (MBS, MCS) or 121 or the like sends back the message to the telephone of the person who requested the service in step 129B.

Since this confirmation message is displayed on an LCD display 43 of the telephone 120 of the person who requested the service, the user A confirms that his or her own telephone is not going to inform any incoming call during the set suspend duration time. Hence, he can turn off the power switch of the telephone 120 to save power.

FIG. 7B explains the procedure for requesting to cancel the suspend service.

More specifically, the subscriber A who wants to request to cancel the service presses the REL button 46 of his or her own telephone 120. The CPU 52 of the telephone 120 detects depression of the button 46 in step 135 in accordance with the program in the ROM 53. In step 136, the CPU 52 sends a suspend service cancel request (see FIG. 5B) to the radio base station (MBS, MCS) 121 or the like. Upon reception of this request message, the radio base station (MBS, MCS) 121 or the like sends a suspend service cancel request to the mobile communication control station (AMC) 122 in step 137. Upon reception of this request, the mobile communication control station (AMC) 122 performs position registration (roaming in some cases) of the subscriber (the person who requested the service) in step 138. The station 122 searches the database in the home memory 130 for a management file of the subscriber that matches the contents of a field 90 in the cancel message in step 139. The station 122 then resets a field (suspend service flag) of the record of that subscriber A in the found file.

The terminal 120 confirms by messages in steps 140 and 141 that the suspend service has been canceled.

Figure 8A:
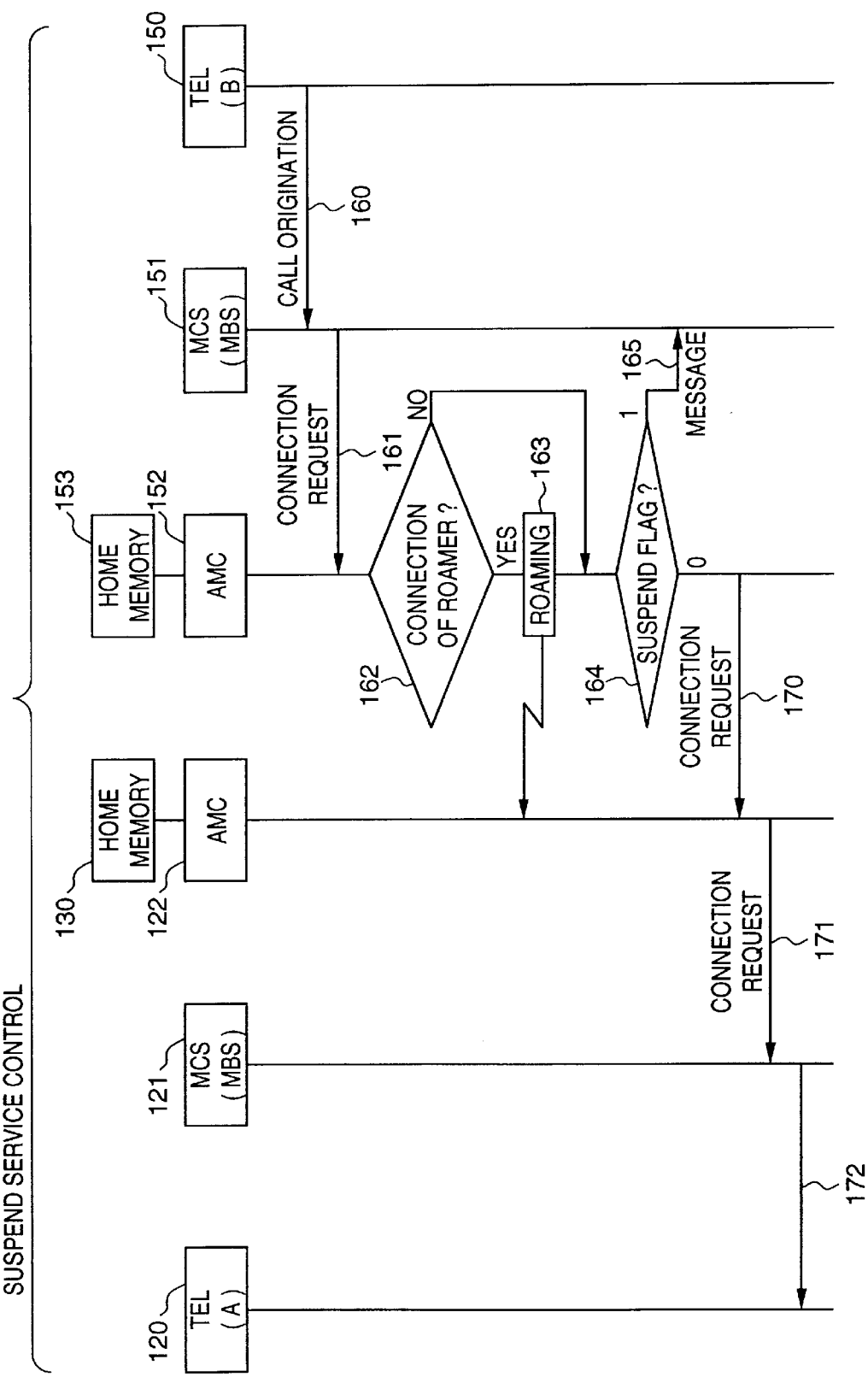
FIG. 8A is a flow chart for explaining the processing sequence of suspend service control according to the first embodiment of the present invention.
Figure 8B:
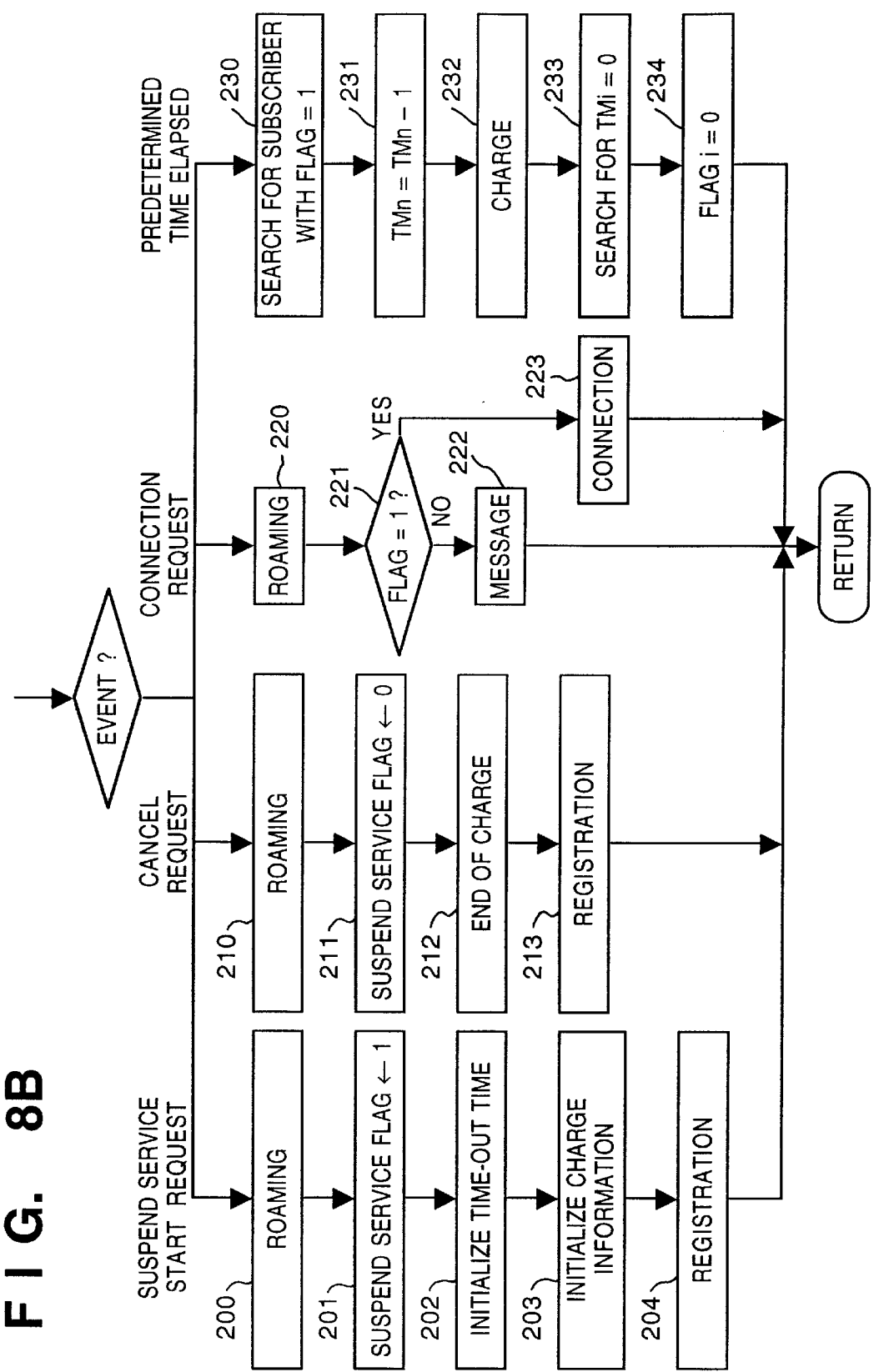
FIG. 8B is a flow chart showing the processing sequence of the suspend service control according to the first embodiment of the present invention, especially, the processing in a mobile communication control station (AMC)

In FIGS. 8A and 8B, assume that the subscriber A has already requested to start the suspend service via the telephone 120, and the start of the suspend service has been registered in the home memory 130 of the mobile communication control station (AMC) 122, for the sake of simplicity. A case will be explained below wherein a subscriber B who belongs to a mobile communication control station (AMC) 152 places a call to the subscriber of the telephone 120 via a telephone 150.

The telephone 150 of the subscriber B places a call to the closest radio base station (MBS, MCS) 151 or the like in step 160. The radio base station (MBS, MCS) 151 or the like sends a connection request to the mobile communication control station (AMC) 152 to which the telephone 150 belongs in step S161. Upon reception of this request, the mobile communication control station (AMC) 152 searches its own home memory 153 in step 162 to check if the subscriber A to be connected is a roamer. If the subscriber A is a roamer, the station 152 executes roaming with the corresponding mobile communication control station (AMC) in step 163 to acquire subscriber information (various kinds of information shown in FIG. 4A) of the subscriber A. The station 122 detects from the contents of a field 71*b* of the subscriber information of the subscriber A obtained by roaming that a mobile communication control station (AMC) of the area where the subscriber A is present is 122.

The mobile communication control station (AMC) 152 checks if the suspend service flag (field 74 in FIG. 4A) among the information of the subscriber A is "1". If the flag is "1", the station 152 sends a predetermined message (i.e., "the subscriber A cannot answer at the moment. Please call again . . . hours later") to the telephone 150 of the subscriber B (if the subscriber B is under the first-class contract), in step 165.

If the subscriber B is under the second-class contract, a message "the subscriber A cannot answer at this moment. Please call again later" is sent back.

If it is determined in step 164 that the telephone 120 of the subscriber A is not under suspension, since the subscriber A can receive a call, the connection request is issued in step 170. This connection request is transmitted to the telephone 120 of the subscriber A in steps 171 and 172.

FIG. 8B is a flow chart showing how to control the suspend service in the mobile communication control station (AMC) 122 or 152.

In the first embodiment, suspend service management information (FIG. 4A) is stored in the home memory (the memory 130 in the example in FIG. 8A) of the mobile communication control station (AMC) (the mobile communication control station 122 in the example in FIG. 8A) closest to the current position of the person (the subscriber A in the example in FIG. 8A) of the suspend service. Hence, the information is not stored in the home memory of the station to which the telephone of the person who requested the service belongs. However, the suspend service of the present invention can be implemented independently of the location of the home memory that stores the management information regarding the suspend service.

In order to implement the suspend service, the mobile communication control station (AMC) that has the suspend service management information must control various events, as shown in FIG. 8B. More specifically, in the example shown in FIG. 8B, the events to be managed by a host computer 10 of the mobile communication control station (AMC) of the first embodiment include generation of a suspend service start request event, generation of a suspend service cancel request event, generation of a connection request event, generation of an elapse event of a predetermined period of time, and the like.

Upon generation of a suspend service start request event, the host computer (or CPU) 10 executes the control procedures in steps 126 and 127 in FIG. 7A. In this case, more specifically, steps 200 to 203 in FIG. 8B are executed. That is, in step 200, roaming and position registration are performed to update the position information of the person who requested the service. In step 201, the suspend service flag in the field 74 in FIG. 4A corresponding to the subscriber telephone of this person is set at "1". In step 202, the time-out time in the field 75 is initialized. In step 203, the charge information for the suspend service is initialized. In step 204, the flag, time-out time, and charge information are stored and registered in the home memory.

Upon generation of a suspend service cancel request event, the control shown in FIG. 7B is executed. In the mobile communication control station (AMC), the control sequences described in detail in steps 210 to 212 in FIG. 8B are executed. That is, in step 210, roaming and position registration are performed to update the position information of the person who requested the service cancel. In step 211, the flag in the field 74 in FIG. 4A corresponding to the subscriber telephone of this person is reset to "0". In step 212, charging ends. In step 213, information indicating that the service request is canceled is registered in the home memory.

Once the suspend duration time designated by the field 82 of the suspend service start request is set (in the field 75) in the database 4 in the home memory of the mobile communication control station (AMC) on the side which requested the service (201), the mobile communication control station (AMC) itself monitors the time elapsed. More specifically, when a predetermined period of time (e.g., one minute) has elapsed in the mobile communication control station (AMC) on the side which requested the service, a time elapse event is generated. Upon generation of this event, step 230 and the subsequent steps in FIG. 8B are executed.

More specifically, in step 230, the suspend service management file (database) 4 stored in the home memory of the mobile communication control station (AMC) is searched to find all the records (i.e., all the subscriber telephones) with suspend service flags="1". The data values (TMn) of time-out times in the fields 75 of all the subscribers (n) with suspend service flags="1" are decremented by 1. In step 232, charges to these subscribers are accumulated.

In step 233, subscribers i with data values (TMi)=0 are searched. The suspend service flags (fields 74) of all the subscribers i (i=1, 2, . . . ) with data values (TMi)=0 are cleared to zero in step 234. On the other hand, the suspend service flags (fields 74) of all subscribers k (k=1, 2, . . . ) whose data values (TMk) have not reached zero are not reset to zero.

As described above, the suspend service information is managed by the mobile communication control station (AMC) closest to the suspend service request point, as described above. Hence, the control sequences in steps 230 to 234 are executed by the mobile communication control station (AMC) on the suspend service request side.

On the other hand, when a connection request event from a radio base station (MBS, MCS) or the like is generated in the mobile communication control station (AMC), steps 162 to 164 in FIG. 8A are executed by the mobile communication control station (AMC) closest to the calling party. More specifically, step 220 and the subsequent steps in FIG. 8B are executed.

That is, in step 220, roaming for the telephone of the connection request destination is performed. With this roaming, the subscriber information of the subscriber A is obtained. In step 221, it is checked if the suspend service flag in the obtained subscriber information is "1". When this flag is "1", since it means that the subscriber B is about to send a connection request to the telephone of the subscriber A in the suspend service mode, the above-mentioned message indicating that the subscriber A is in the suspend service mode is sent back to the subscriber B in step 222. The flow then returns to the main routine, and connection to the subscriber A is not made. On the other hand, if the flag is zero, the connection proceeds in step 223.

As described above, according to the suspend service of the first embodiment, when a person places a call to a hand-held telephone set with a suspend duration time during that suspend duration time (flag=1 in step 221), since the calling party can receive a message indicating the suspend service mode and the time duration required until the suspend duration time expires (step 222), he or she can recognize the current situation, and can place a call again, thus avoiding anxiety and irritation on the side of the calling party.

On the other hand, the user of the telephone set in the suspend service mode can devote himself or herself to another business during the suspend period.

Furthermore, when the user of the hand-held phone wants to cancel the suspend duration time since the business has ended earlier than he or she expected, he or she can cancel the suspend duration time by operating his or her hand-held telephone (step 211).

Second Embodiment

In the service system of the first embodiment, the suspend service is managed at the exchange side. For this reason, the suspend service can be centralized, and the running cost can be reduced. However, when the exchange manages the suspend service, the system of the exchange must be altered, resulting in high initial cost. In view of this problem, in the second embodiment, the suspend service is managed at the telephone side.

In the second embodiment, when a subscriber who requests the suspend service sets the suspend service mode at his or her own telephone, the telephone stores that the suspend service mode is being set. If the telephone receives a call during the suspend period, the telephone itself sends back a message indicating "suspending" to the calling party.

Figure 9:
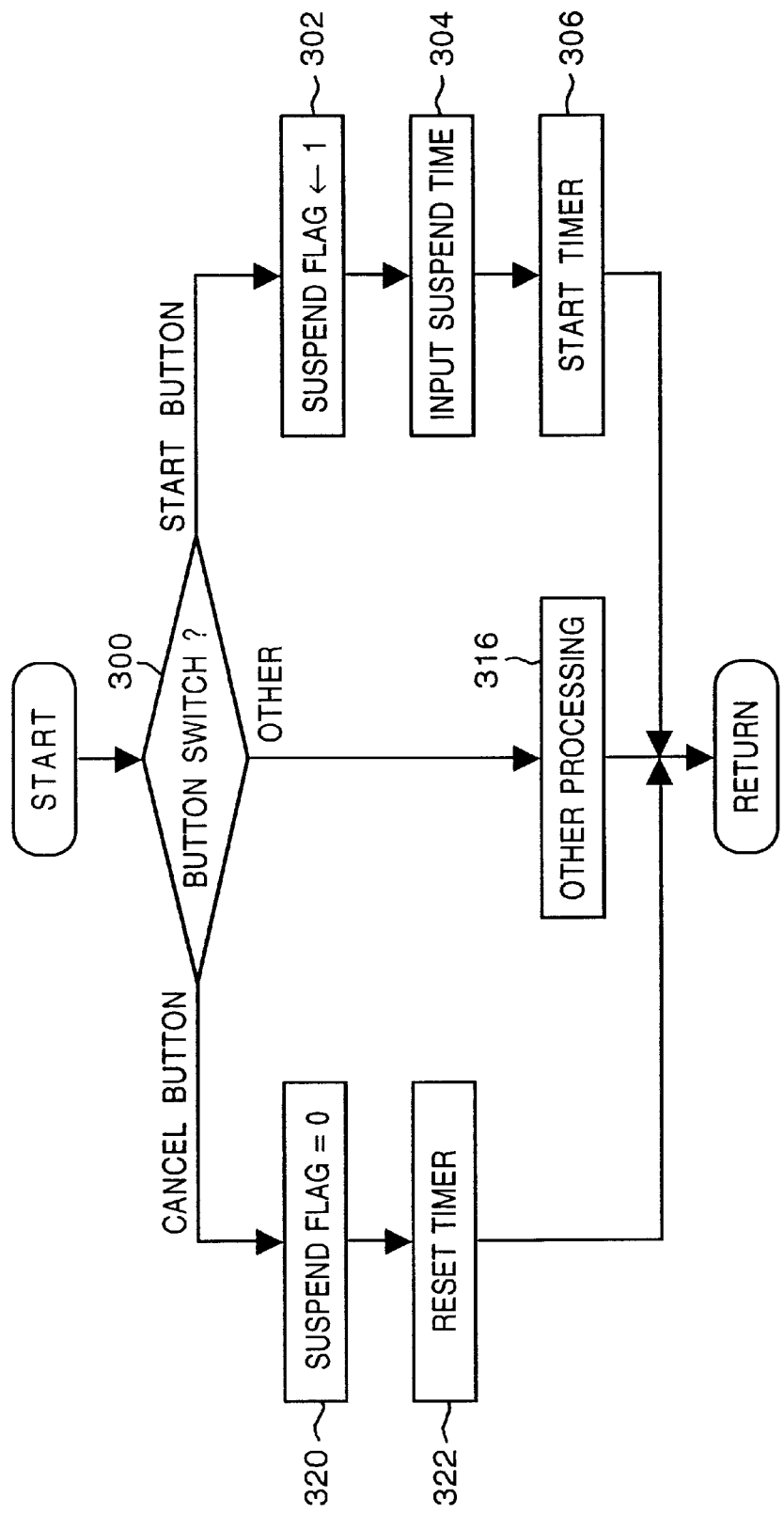
FIG. 9 is a flow chart for explaining the processing sequence for suspend service start and cancel requests used in the second embodiment of the present invention.
Figure 10:
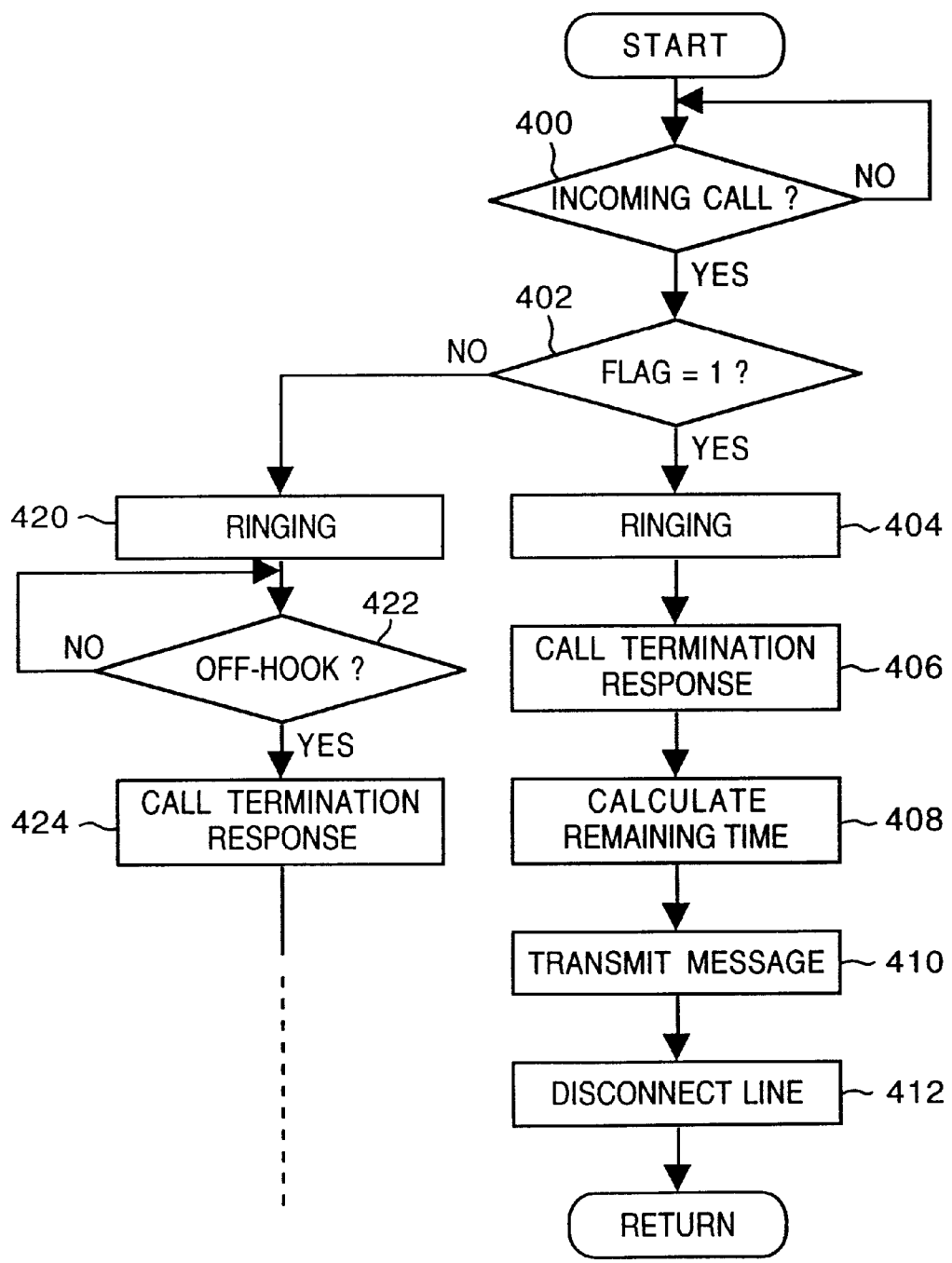
FIG. 10 is a flow chart for explaining the processing sequence of the suspend service used in the second embodiment of the present invention.

FIG. 9 is a flow chart showing the processing procedure associated with suspend service request control and cancel request control. FIG. 10 is a flow chart showing the processing procedure upon reception of a call when the suspend service mode has already been set.

The second embodiment can use the arrangement of a conventional exchange and a conventional digital network. Also, the second embodiment can use the telephone of the first embodiment (FIGS. 3A to 3C), but the contents of the program in its ROM are changed, as shown in FIGS. 9 and 10.

More specifically, when a suspend service start request button 45 is pressed, the flow advances from step 300 to step 302 to set a suspend flag stored at a predetermined address in a RAM at "1". In step 304, a message for prompting the user to input a desired suspend service time is displayed on a display 43. When a time is input from the ten-key pad, a CPU 52 starts a timer (not shown) in step 306.

On the other hand, when a cancel button 46 is pressed, the suspend flag is reset in step 320, and the timer is reset in step 322.

Upon reception of a call placed by another subscriber, the telephone in the suspend service mode executes the control procedure shown in FIG. 10.

More specifically, upon reception of a call in step 400, it is checked in step 402 if the suspend flag is set. If the suspend flag is not set, since a normal reception mode is set, the control advances to step 420 and the subsequent steps.

On the other hand, if the suspend flag is set, a ringing signal is sent back to the calling party in step 404. However, no ringing tone is produced at the main body, but a vibration member 48 (FIG. 3C) is vibrated to inform only the user of call reception. In step 406, a call termination response is made in place of the user. In step 408, the remaining time is calculated. In step 410, a message indicating that the telephone is in the suspend service mode and asking the calling party to call again after an elapse of the time calculated in step 408 is sent back. After the message is sent back, disconnection processing is made in step 412.

According to the second embodiment, the suspend service can be implemented as in the first embodiment.

The control procedures according to the above-mentioned two embodiments are implemented by a computer program in an exchange (first embodiment) or in a telephone. The program should be stored in an electronic memory such as a ROM or the like or a magnetic storage medium such as a magnetic disk or the like.

Modifications

Various modification of the present invention can be made without departing from the scope of the invention.

M1: For example, the first and second embodiments exemplify a digital network, but the present invention can be applied to an analog network.

M2: In the first embodiment, the suspend service management information in the suspend information is managed by the mobile communication control station (AMC) closest to the person who requested the service. However, the present invention is not limited to this. For example, such information may be simultaneously managed by the home memory of the station to which the person who requested the service belongs.

M3: In the above embodiments, a combination of the first- and second-class services are offered. However, the first- or second-class service alone can be offered. By adopting such multiple contract patterns, the user can have many choices.

M4: In the above embodiments, the present invention is applied to a so-called hand-held telephone. However, the present invention can also be applied to every kind of mobile communication devices such as a hand-held telephone, a radio paging receiver, a simple hand-held telephone, a hand-held telephone with a radio paging receiver function, a simple hand-held telephone with a radio paging receiver function, and the like.

M5: In the above embodiments, the suspend function is isolated from other functions, but may be linked to other functions (for example, an automatic answering recording function, transfer function, and the like).

For example, assume that the calling party has a message he or she urgently needs to send to the called party. In such case, if the called party is in the suspend state, the calling party cannot inform him or her of that message. In view of this problem, when the suspend message is sent back from the telephone of the called party, the calling party can select whether his or her message is automatically recorded or is transferred to another place. In such link function, when the calling party operates a predetermined key within a predetermined period of time (e.g., within 10 sec) after the suspend message was sent back, one of the above-mentioned functions is selected.

For example, when the calling party selects the automatic recording function, a message is recorded in the mobile communication control station (AMC) in either the first or second embodiment. When the suspend duration time has elapsed or the user requests to cancel the suspend function, the telephone requests the mobile communication control station (AMC) to send the recorded message.

M6: In the above embodiments, the suspend message is equally sent back to all the calling parties, but this function may be modified to add the following function. That is, calls placed by some specific calling parties are not denied termination despite the suspend service mode. That is, a call originated by such calling party registered in advance at the call termination side is allowed to come through, and a ringing tone is produced as usual.

M7: In the above embodiments, the suspend service are equally offered in all the zones. Alternatively, a specific zone may be designated in advance, and call termination may be accepted (or denied) in the designated zone alone.

M8: Various mobile communication systems have been proposed worldwide, and differ depending on countries. However, the present invention can be applied to telephone services of every countries using nearly every type of hand-held telephones.

M9: The above embodiments have proposed a system in which the user sets the suspend service using his or her own telephone. Alternatively, the user may set the suspend service in a specific hand-held telephone using another telephone such as a stationary telephone.

M10: In the above two embodiments, the suspend service time duration can be freely set by the user. However, the present invention is not limited to this, and the initial suspend service time duration may be fixed.

More specifically, in the first embodiment, when the user signs a service contract, or when the user sends a command to the mobile communication control station (AMC) by operating a predetermined key (other than the keys 45 and 46) at the telephone, the initial time duration may be permanently registered in the home memory of that mobile communication control station (AMC).

In the second embodiment, a key switch for setting the hand-held telephone in a mode of inputting the initial time is added, so that the user can set an arbitrary fixed initial time using this key switch. On the other hand, the initial time may be fixed at 30 minutes or 1 hour in the program (that cannot be changed by the user).

The suspend service duration is normally fixed in correspondence with the work pattern or life-style of the user of the hand-held telephone. Therefore, even when the time duration is fixed, there is no particular inconvenience. In this case, since the user need not be set the suspend service time duration, convenience can be improved.

In the modification in which the suspend duration time is fixed, if the meeting is finished earlier than expected, the user need only operate the above-mentioned cancel key 46 to cancel the suspend mode.

M11: In the above embodiment, the suspend service is requested under the assumption that the user has signed the suspend service contract. Of course, the step of checking if the subscriber has signed the contract upon reception of the suspend service start request, and the step of ignoring the request if he or she has not signed the contract yet may be added to, e.g., step 138 or 139 in FIG. 7B.

M12: In the above embodiments, the present invention is applied to a hand-held telephone. However, the present invention is not limited to this, but can be applied to every other telephones as long as they are used by users who require the suspend service.

As described above, according to the present invention, a communication service method that can clearly inform the calling party that the called party is intentionally set in the suspend state, a hand-held telephone, and a memory that stores a program for implementing that service method can be provided.

As many apparently widely different embodiments of the present invention can be made without departing from the spirit and scope thereof, it is to be understood that the invention is not limited to the specific embodiments thereof except as defined in the appended claims.

What is claimed is:

1. A communication service method for telephones, comprising the steps of:

initially setting a telephone in a suspend mode in which incoming calls at the telephone are denied for a suspend duration time period;

monitoring, until a call is initiated for the telephone, elapsed time of the suspend duration time period after the telephone was initially set in the suspend mode to calculate a remaining suspend time for which the suspend mode for the telephone is held until the suspend mode terminates on the basis of the elapsed time; and transmitting to a calling party a message including information which indicates the remaining suspend time, and information which indicates the telephone is in the suspend mode.

2. The method according to claim 1, wherein said setting step comprises the step of detecting that a suspend-mode switch provided to the telephone is operated by a user.

3. The method according to claim 1, wherein the suspend duration time period set in said setting step and the remaining suspend time calculated in said monitoring step are stored in a memory of the telephone.

4. The method according to claim 1, wherein the suspend duration time period set in said setting step and the remaining suspend time calculated in said monitoring step are stored in a memory of a telephone exchange station.

5. The method according to claim 4, wherein the message is generated by a telephone exchange station, and is sent from the exchange to the calling party.

6. The method according to claim 3, wherein the message is generated by the telephone and is sent from the telephone to the calling party.

7. The method according to claim 1, wherein the information indicating that the telephone is set in the suspend mode is stored in a database of a telephone exchange station.

8. The method according to claim 1, wherein when the telephone sends a suspend mode start request to a telephone exchange station, the telephone exchange station checks if the telephone is under a suspend service contract.

9. The method according to claim 1, wherein the suspend mode that has been started can be canceled.

10. The method according to claim 1, wherein a suspend service is charged for.

11. The method according to claim 1, wherein an initial suspend time period set when the suspend mode is initially set is fixed.

12. The method according to claim 1, wherein an initial suspend time period set when the suspend mode is initially set can be set to any value by a user by an operation at the telephone.

13. The method according to claim 1, wherein information indicating that the telephone is set in the suspend mode is managed by a telephone exchange station closest to the telephone.

14. The method according to claim 1, wherein information indicating that the telephone is set in the suspend mode is managed by a telephone exchange station to which the telephone belongs.

15. A telephone which can set a suspend mode in which a message indicating than said telephone is currently in the suspend mode is sent back to a calling party, comprising:

a first switch which allows a user to initially set the telephone in the suspend mode for a suspend duration time period;

means for monitoring, until a call is received, an elapsed time of the suspend duration time period since the suspend mode was initially set to calculate a remaining suspend time for which the suspend mode for the telephone is held until the suspend mode terminates on the basis of the elapsed time; and means for transmitting to the calling party the message including the remaining suspend time.

16. The telephone according to claim 15, further comprising a second switch which allows a user to set an initial suspend duration time.

17. The telephone according to claim 15, further comprising a third switch for canceling the suspend mode that has been set.

18. The telephone according to claim 15, further comprising means for sending an identification number of said telephone and a request command indicating that the suspend mode is started to a telephone exchange station in response to an operation of said first switch.

19. The telephone according to claim 15, wherein the suspend mode is forcibly reset when said third switch is operated.

20. A storage medium, which stores a program that can be executed by a computer build in a telephone, comprising:

first program code means for setting the telephone in a suspend mode upon operation of a first switch provided to the telephone by a user;

second program code means for setting an initial time duration period of the suspend mode in response to an operation of the first switch;

third program code means for monitoring, until a call is received, an elapsed time of the suspend duration time period after the telephone was initially set in the suspend mode to calculate a remaining suspend time for which the suspend mode for the telephone is held until the suspend mode terminates on the basis of the elapsed time; and fourth program code means for generating a message that informs a calling party that the telephone is in the suspend mode and of the remaining suspend time in order to transmit the message to the calling party.

21. A method according to claim 1, wherein the telephone is a hand-held telephone.

22. A hand-held telephone according to claim 15.

23. A telephone exchange system comprising:

means for receiving a request for placing a telephone in a suspend mode in which incoming call at the telephone are denied for a suspend duration time period;

means, operatively connected to said receiving means, for setting, when the request is received, the telephone in the suspend mode;

means for detecting, when a call is initiated for the telephone, an elapsed time after the telephone was initially set in the suspend mode until the call is initiated, and calculating a remaining suspend time for which the suspend mode for the telephone is held suspended until the suspend mode terminates on the basis of the detected elapsed time; and means for transmitting to a calling party of the call a message including information which indicates the remaining suspend time, and information which indicates the telephone is in the suspend mode.

\* \* \* \* \*

UNITED STATES PATENT AND TRADEMARK OFFICE
CERTIFICATE OF CORRECTION

PATENT NO. : 6,208,852 B1
DATED : March 27, 2001
INVENTOR(S) : Konishi

It is certified that error appears in the above-identified patent and that said Letters Patent is hereby corrected as shown below:

Column 9,
Line 52, "Si6i" should read -- 161 --

Column 16,
Line 47, "detecting" should read -- monitoring --
Line 47, "when" should read -- until --
Line 49, insert -- of the suspend duration time period -- after "time"
Lines 50-51, "until the call is initiated, and calculating" should read -- to calculate --
Line 53, delete "suspended" before "until"
Line 54, delete "detected" before "elapsed"
Line 55, delete "of the call" after "party"

Signed and Sealed this

Twentieth Day of August, 2002

*Attest:*

*Attesting Officer*

JAMES E. ROGAN
*Director of the United States Patent and Trademark Office*